US005177888A

United States Patent [19]

Thorud et al.

[11] Patent Number: 5,177,888

[45] Date of Patent: Jan. 12, 1993

[54] DISCHARGE CHUTE ASSEMBLY FOR SNOWTHROWER

[75] Inventors: Richard A. Thorud, Bloomington; Thomas K. Bricko, Lakeville; John R. Hacker, Burnsville; David E. Larsen; Dean R. Toensing, both of Minnetonka; Donald M. White, III, Chanhassen, all of Minn.

[73] Assignee: The Toro Company, Minneapolis, Minn.

[21] Appl. No.: 699,876

[22] Filed: May 14, 1991

[51] Int. Cl.[5] ..... E01H 5/08

[52] U.S. Cl. ..... 37/260; 38/244; 406/160; 406/162; 193/16; 193/22

[58] Field of Search ..... 37/260, 261, 262; 406/157, 159, 160, 161, 162, 163; 193/16, 21, 22

[56] References Cited

U.S. PATENT DOCUMENTS

| | | | |
|---|---|---|---|
| 537,691 | 4/1895 | Landis | 406/159 X |
| 742,669 | 10/1903 | Kailor | 406/159 |
| 840,603 | 1/1907 | Bodvig . | |
| 1,552,714 | 4/1925 | Linzy . | |
| 1,657,403 | 1/1928 | Kohls et al. | 406/159 |
| 2,194,662 | 3/1940 | Klauer . | |
| 2,508,829 | 5/1950 | Lamy . | |
| 2,605,561 | 8/1952 | Maynard et al. . | |
| 2,642,680 | 6/1953 | Curtis et al. . | |
| 2,768,453 | 10/1956 | Adams, Jr. . | |
| 3,115,715 | 12/1963 | Baldwin | 37/260 X |
| 3,299,546 | 1/1967 | Ibisch . | |
| 3,466,767 | 8/1969 | Rubin . | |
| 3,497,264 | 2/1970 | Kaufman . | |
| 3,509,977 | 5/1970 | Bacon | 37/261 X |
| 3,510,171 | 5/1970 | Bacon . | |
| 3,544,137 | 12/1970 | Contreras et al. . | |
| 3,552,045 | 1/1971 | Fieber . | |
| 3,695,645 | 10/1972 | Mommsen . | |
| 3,828,450 | 8/1974 | Boeck . | |
| 3,867,773 | 2/1975 | Gunderson | 37/43 R |
| 3,879,866 | 4/1975 | Gunderson . | |
| 3,913,247 | 10/1975 | Ruhl | 37/43 |
| 4,376,345 | 3/1983 | Hochwitz | 37/260 |
| 4,651,452 | 5/1985 | Husso | 37/225 |

*Primary Examiner*—David H. Corbin
*Assistant Examiner*—Arlen L. Olsen
*Attorney, Agent, or Firm*—John W. Bunch

[57] ABSTRACT

A discharge chute assembly (30) includes a chute (32) and a pivotal deflector (34), the overlapping end portions of which define a partial spherical or ball joint (40) which maintains a tight seal against backflow and leakage over the entire range of rotation and deflection of the assembly. The assembly (30) is preferably secured to a rotatable base (54) by means of lower pivots (70) and a releasable fastener (72) for collapsibility.

15 Claims, 3 Drawing Sheets

30 34 36 32 64 2 2 70 54 24 16 17 12 18 26 10 20 22 14

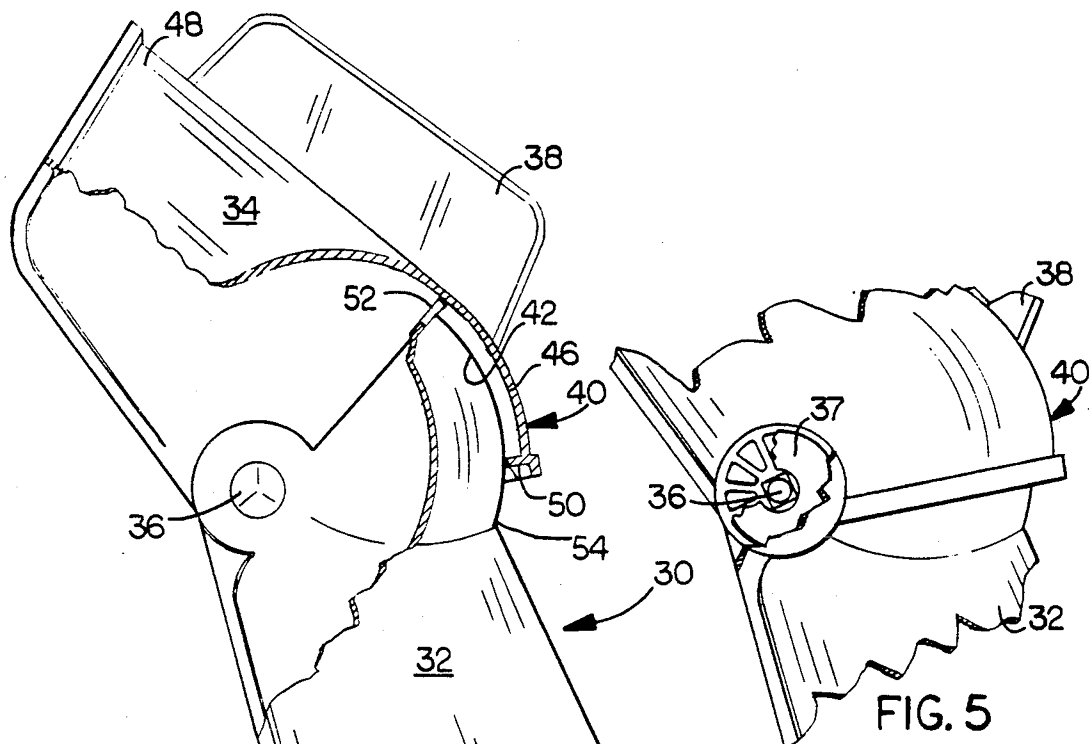
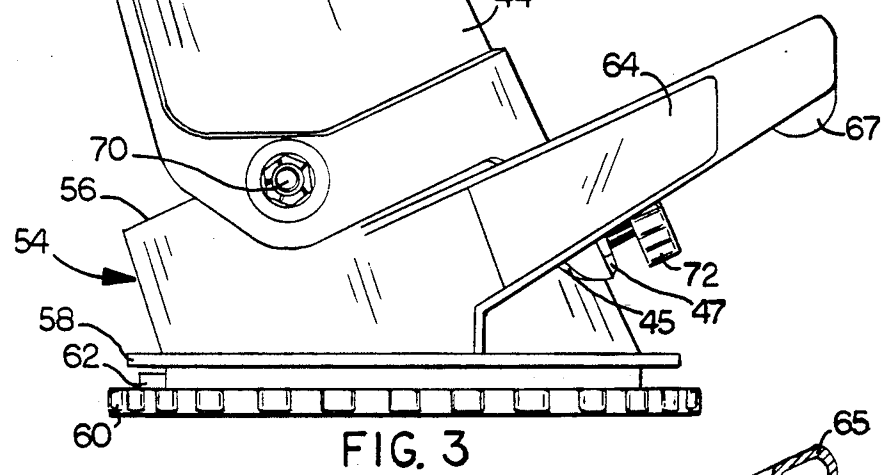
FIG. 3
FIG. 5
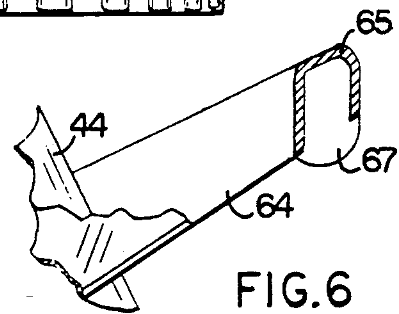
FIG. 6

DISCHARGE CHUTE ASSEMBLY FOR SNOWTHROWER

TECHNICAL FIELD

The present invention relates generally to material conveyance. More particularly, this invention concerns an improved discharge chute assembly for a snowthrower which minimizes backflow or leakage at high angles of pivotal rotation and/or deflection, and which can be readily collapsed into more compact form for transportation or storage.

BACKGROUND ART

Snowthrowers typically incorporate pivotal discharge chutes for directing the snow forwardly or to one side or the other, as desired. Moreover, a pivotal deflector is usually provided at the end of the discharge chute for adjusting the angle of deflection in order to change the distance the snow is thrown. Such discharge chute assemblies are typically located in a central position atop the snowthrower.

Various such discharge chute assemblies have been available heretofore. For example, some discharge chute assemblies incorporate telescoping sections. U.S. Pat. Nos. 1,552,714 to Linzy and 2,768,453 to Adams are representative in this regard. Other discharge assemblies incorporate a deflector which is pivoted to the outer end of the chute. For example, U.S. Pat. Nos. 3,879,866 and 3,867,773 to Gunderson and U.S. Pat. No. 3,828,450 to Boeck show discharge chute assemblies wherein the deflector is secured by means of a fixed pivot. However, such discharge chute assemblies tend to leak snow backwardly at the junction between the chute and deflector, particularly at extreme angles of rotation and/or deflection. This disadvantage also has been recognized in the prior art. For example, one approach to this problem has been to provide a flexible seal at the pivot joint and deflector, as shown in U.S. Pat. No. 4,376,345 to Hochwitz. Another approach has been to provide a sliding pivot connection. U.S. Pat. No. 3,552,045 to Fieber and U.S. Pat. No. 3,510,171 to Bacon are illustrative of this latter approach. While these attempts have not been completely ineffective, they have not been altogether satisfactory either.

There is still a need for a discharge chute assembly for snowthrowers which eliminates such leakage over the entire range of pivotal adjustment.

SUMMARY OF THE INVENTION

The present invention comprises an improved discharge chute assembly which overcomes the foregoing and other difficulties associated with the prior art. In accordance with the invention, there is provided a discharge chute assembly including a chute and deflector which are pivoted together at overlapping semi-spherical end portions to define a ball joint which maintains a tight seal over the entire pivotal range. The base of the chute is preferably adjusted for rotational adjustment over a wide arc. In accordance with the preferred embodiment, the chute is pivoted to the base by means of a releasable connection so that the discharge chute assembly can be collapsed when not in use, for transportation or storage.

BRIEF DESCRIPTION OF DRAWING

A better understanding of the invention can be had by reference to the following Detailed Description in conjunction with the accompanying drawing, wherein:

FIG. 3 is a side view (partially cut away) showing the discharge chute assembly incorporating a first embodiment of the invention;

FIG. 5 is an illustration (partially cut away) showing details of the pivot connection between the chute and the deflector of the first embodiment; and FIG. 6 is an illustration (partially cut away) of the lift handle.

DETAILED DESCRIPTION

Figure 1:
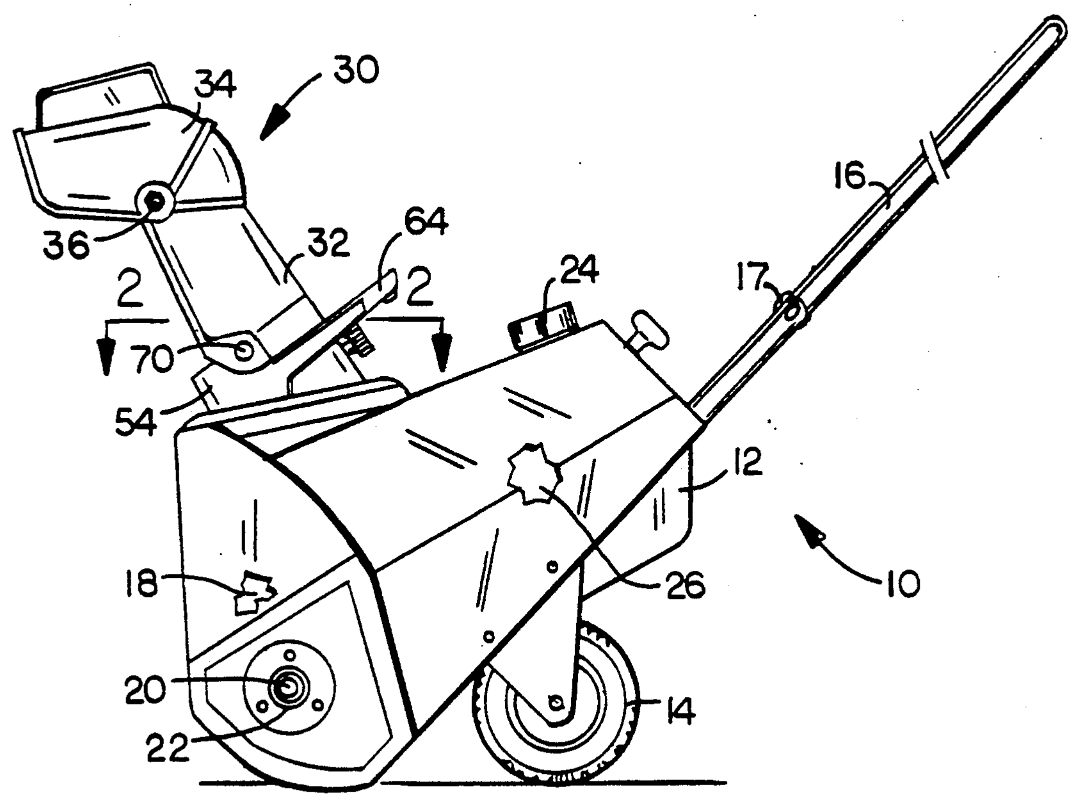
FIG. 1 is a side view of a snowthrower incorporating the discharge chute assembly of the present invention.

Referring now to the drawing, wherein like reference numerals designate the like or corresponding elements throughout the views, and particularly referring to FIG. 1, there is shown a snowthrower 10 including a housing 12 supported by wheels 14. A handle 16 extends from the rear of housing 12 for pushing the snowthrower 10. The handle 16 is preferably of split construction having a fixed inner portion and a pivotal outer portion secured together by hand screws 17, only one of which is shown, so that the handle can be folded. A rotor blade 18 is carried by a shaft 20 supported for rotation between a pair of bearings 22 located in extensions on opposite sides of the front end of housing 12. The housing 12 encloses a fuel tank (not shown) which can be filled via cap 24 and which supplies engine 26 therein. The engine 26 in turn is drivingly connected to the rotor blade 18 in order to propel snow outwardly through the discharge chute assembly 30 of the present invention.

As will be explained more fully hereinafter, the discharge chute assembly 30 is adapted to eliminate snow leakage, even at extreme positions of rotation and deflection, and is further adapted to fold down when not in use in order to present a more compact profile for transportation and storage.

Figure 2:
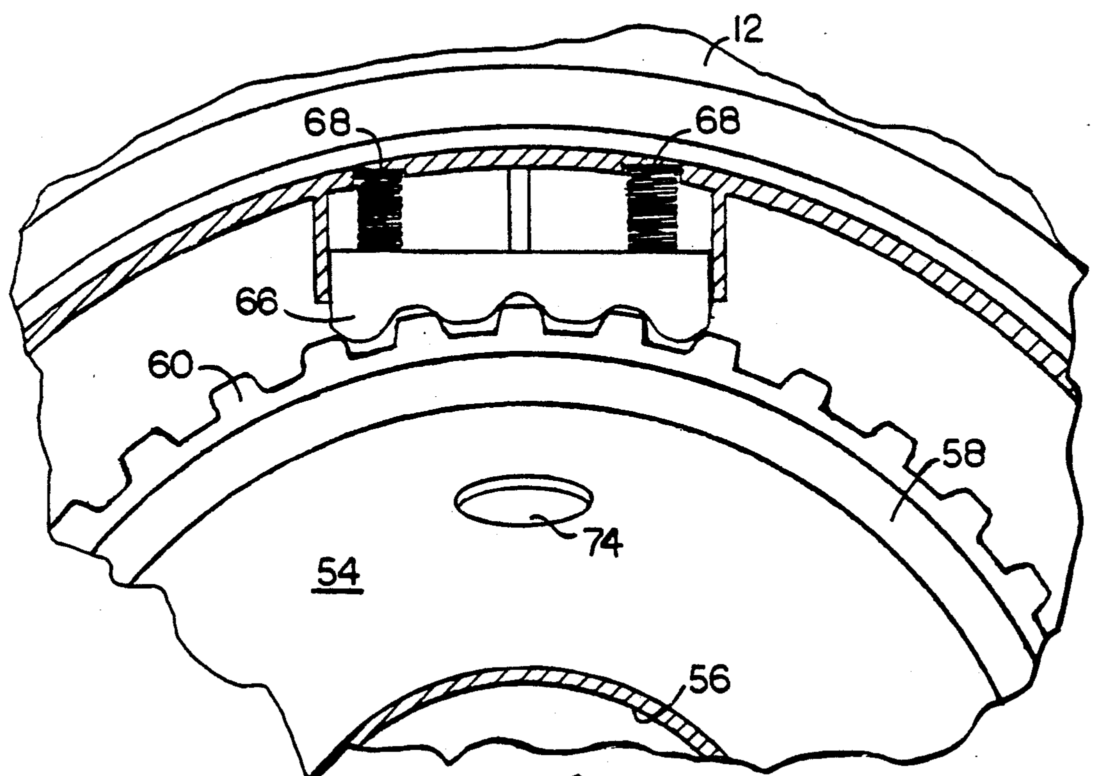
FIG. 2 is an enlarged, partial cross-sectional view taken along lines 2—2 of FIG. 1 in the direction of the arrows.

Referring now to FIGS. 2, 3 and 5 in conjunction with FIG. 1, the discharge chute assembly 30 includes a chute 32 and a deflector 34 which are interconnected at their overlapping ends by fixed pivots 36. In accordance with the preferred construction, the chute 32 and deflector are of molded polyethylene and each pivot 36 comprises a carriage screw, a rubber washer 37 positioned between the adjoining surfaces of the chute 32 and deflector 34, a metal washer positioned on the outside surface of the deflector, and a lock nut secured to the threaded end of the screw. As is best seen in FIG. 5, the inner adjoining surface of deflector 34 is preferably ribbed in order to enhance frictional engagement with the rubber washer 37 so that the deflector maintains its set position during operation of the snowthrower.

The chute 32 and deflector 34 are each of generally semicircular cross section, with the open side facing forwardly, and are preferably of decreasing radius in a direction away from the snowthrower 10 in order to define a converging pathway for the snow.

A handle 38 is preferably provided on the deflector 34 to facilitate manual adjustment thereof.

A partial ball or spherical joint 40 is provided between overlapping portions of the chute 32 and deflector 34. As is best seen in FIG. 3, the upper end of the chute 32 includes an enlarged portion 42 of greater radius than the lower end 44 of the chute 32, which extends over a predetermined arc that defines the range of deflection of deflector 34. For example, in the preferred embodiment, the enlarged portion 42 extends over an arc of about 65 degrees and has an inside radius of about 2.86 inches about the axis of pivots 36 in a central plane extending vertically through the chute assembly 30, while the lower portion 44 of the chute has an inside radius of about 2.32 inches. The lower end 46 of the deflector 34 includes a larger complementary inside radius, such as about 3.17 inches which in turn fairs smoothly into the outer portion 48 of the deflector. A partial flange 50 is provided at the terminus of the lower end 46 of deflector 34. Similarly, a partial circumferential flange 50 is provided at the terminus of the upper end 42 of the chute 32. The flange 52 serves as a stop upon engagement with flange 50, to limit downward deflection of the deflector 34. The transistion between the partial spherical upper end 42 and the generally cylindrical lower end 44 of chute 32 serves as a stop to limit upward deflection of deflector 34.

The arcuate portions of the ball joint 40 thus have a common center of curvature, which means that they can be constructed to maintain close tolerances over their entire range of movement in order to minimize any gap therebetween and thus eliminate leakage of snow. Further, as the snow moves upwardly along the inside surface of chute 32, contact is broken at the transition 54 in order to reduce pressure in the area of the ball joint 40. This comprises a significant feature of the present invention.

The lower end 44 of the chute 32 is secured in the top of the housing 12 of snowthrower 10 for rotation about a generally upright axis. The base 54 includes an upper throat section 56, which is of generally cylindrical cross section and is angled forwardly at about 20 degrees as shown, a smooth intermediate flange 58, and a lower toothed flange 60. A stop 62 is also provided for engagement with a pair of circumferentially spaced-apart stops (not shown) in the housing 12 in order to define the desired arc of rotation, such as about 210 degrees in the preferred embodiment, of the chute assembly 30.

Rotational positioning of the chute assembly 30 is controlled by a handle 64 and a toothed detent 66, as is best seen in FIG. 2. The detent 66 is guided within a portion of the housing 12 and constrained for movement thereby toward and away from the lower flange 60 of the base 54. Compression springs 68 normally urge the detent 66 into engagement with the toothed flange 60. The corners of the teeth on flange 60 are preferably chamfered as shown, while the corners of the adjoining teeth on detent 66 are relatively more rounded in order to provide sufficient resistance to slippage to retain the chute assembly in the desired rotational position during operation, while allowing manual readjustment. Referring to FIGS. 3 and 6, the handle 64 extends rearwardly and is preferably integrally secured to the base 54. In addition to facilitating manual adjustment of the desired rotational position of the chute assembly 30, the handle 64 can also be used for lifting the snowthrower 10. The outer transverse portion 65 of the handle 64 is preferably of generally inverted U-shaped cross-section with tabs 67 molded at spaced apart intervals therein to reduce weight while providing rigidity, a good gripping surface and a solid feel.

In accordance with the preferred construction, the chute 32 is secured to base 54 with a pair of fixed pivots 70 and a releasable connector 72. Each fixed pivot 70 comprises a carriage screw, washer and lock nut. The releasable fastener 72 includes a carriage screw extending through a hole 74 in the throat section 56 of base 56 and a registering hole (not shown) in an extending tail portion 45 of the lower end 44 of chute 32, with a handle screwed thereon. Release of fastener 72 allows the chute assembly 30 to rotate forwardly about pivot 70 into a collapsed position of more compact dimensions for transportation or storage. With the throat section 56 thus open, the extending tail portion 45 serves a safety purpose by partially blocking any discharge of snow directly upward. A partially surrounding, conforming rib 47 is preferably provided to help secure fastener 72 against loosening during operation.

Figure 4:
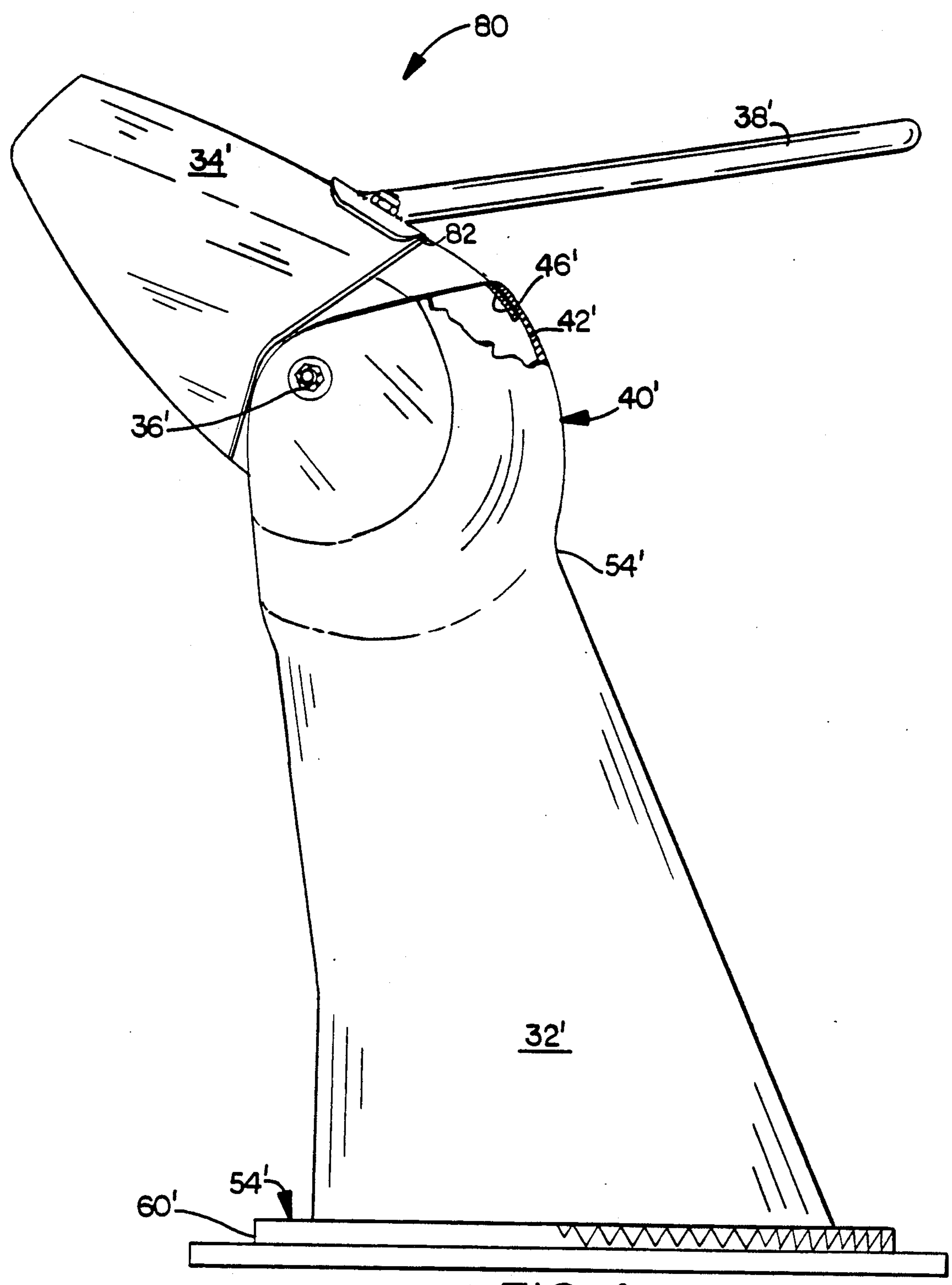
FIG. 4 is a side view (partially cut away) of a discharge chute assembly incorporating a second embodiment of the present invention.

FIG. 4 shows a discharge chute assembly 80 incorporating a second embodiment of the present invention. The chute assembly 80 incorporates several components which are substantially similar to components of the chute assembly 10 of the first embodiment herein. The same reference numerals have been utilized to identify these components, except that prime (') notations have been added for differentiation. It will be noted that the inner end 46' of the deflector 34' of chute assembly 80 fits inside the outer end 46' of the chute 32', which is the reverse of the orientation of the corresponding components of the chute assembly 10 of the first embodiment. It will thus be understood that either relative orientation can be used and that neither is critical to practice of the present invention. In chute assembly 80, abutting engagement between the top shoulder 82 on deflector 34' and the upper end portion 42' of the chute 32' serves as the up stop, while engagement between these portions on the sides serves as the down stop.

From the foregoing, it will thus be apparent that the present invention comprises an improved discharge chute assembly having several advantages over the prior art. One advantage is the use of a partial spherical or ball joint between overlapping ends of the deflector and chute in order to maintain a consistent seal over the entire deflection range, and thus eliminate backflow or leakage. Another advantageous feature is that the chute assembly can be collapsed for transportation or storage. Other advantages will be evident to those skilled in the art.

Although particular embodiments of the invention have been illustrated in the accompanying drawing and described in the foregoing Detailed Description, it will be understood that the invention is not limited only to the embodiments disclosed, but is intended to embrace any alternatives, equivalents, modifications, and/or rearrangement of elements falling within the scope of the invention as defined by the following claims.

What is claimed is:

1. A discharge chute assembly for a snowthrower, which comprises:

a generally semi-cylindrical deflector having an arcuate inner end of predetermined radius, and an outer end;

a generally semi-cylindrical chute having an inner end, and an arcuate outer end of predetermined radius substantially similar to that of the inner end of said deflector but substantially greater than that of an adjacent intermediate portion of said chute;

means for connecting the respective inner and outer arcuate ends of said deflector and said chute in overlapping relationship for relative pivotal movement about a first transverse axis in order to define an enlarged partial spherical joint;

first stop means for limiting relative pivotal movement of said deflector and said chute over a predetermined arc of deflection;

a tubular rotatable base, said base being supported on the snowthrower for rotation about a generally upright axis;

means for securing the inner end of said chute to said base for rotation therewith;

second stop means for limiting relative rotation of said base over a predetermined arc of rotation; and manual detent means for releasably retaining said base in selective position over the arc of rotation.

2. The discharge chute assembly of claim 1, wherein said deflector is generally semi-cylindrical having a radius of curvature therealong substantially the same as that of the arcuate end thereof.

3. The discharge chute assembly of claim 1, wherein said deflector and said chute are of molded plastic.

4. The discharge chute assembly of claim 1, wherein said first stop means comprises flanges on the overlapping arcuate ends of said deflector and said chute.

5. The discharge chute assembly of claim 1, further including:

a handle secured to said deflector.

6. The discharge chute assembly of claim 1, further including:

a lift handle secured to said base away from the direction of pivotal movement of said deflector.

7. A discharge chute assembly for a snowthrower, which comprises:

a generally semi-cylindrical deflector having an arcuate inner end of predetermined radius, and an outer end;

a generally semi-cylindrical chute having an inner end, and an arcuate outer end of predetermined radius substantially similar to that of the inner end of said deflector but substantially greater than that of an adjacent intermediate portion of said chute;

means for connecting the respective inner and outer arcuate ends of said deflector and said chute in overlapping relationship for relative pivotal movement about a first transverse axis in order to define an enlarged partial spherical joint;

first stop means for limiting relative pivotal movement of said deflector and said chute over a predetermined arc:

a tubular rotatable base, said base being supported on the snowthrower for rotation about a generally upright axis;

means for pivotally securing the inner end of said chute to said base for relative pivotal movement about a second transverse axis between extended and collapsed positions, and for rotation therewith about the upright axis;

second stop means for limiting relative rotation of said base over a predetermined arc;

manually actuated detent means for releasably retaining said base in selective position over the arc of rotation; and manually actuated means for releasably securing said chute to said base in the extended·position.

8. The discharge chute assembly of claim 7, wherein said deflector and said chute are both formed of molded plastic.

9. The discharge chute assembly of claim 7, further including:

a handle secured to said deflector.

10. The discharge chute assembly according to claim 9, further including:

a lift handle secured to said base on a side away from said deflector.

11. A discharge chute assembly for a snowthrower, which comprises:

a generally semi-cylindrical deflector having an arcuate inner end of predetermined radius, and an outer end;

a generally semi-cylindrical chute having an inner end, and an arcuate outer end of predetermined radius substantially similar to that of the inner end of said deflector but substantially greater than that of an adjacent intermediate portion of said chute;

means for connecting the respective inner and outer arcuate ends of said deflector and said chute in overlapping relationship for relative pivotal movement about a first transverse axis in order to define an enlarged partial spherical joint;

first stop means for limiting relative pivotal movement of said deflector and said chute over a predetermined arc of deflection;

first means for releasably retaining said deflector in selective position over the arc of deflection;

a tubular rotatable base, said base being supported on the snowthrower for rotation about a generally upright axis;

means for securing the inner end of said chute to said base for rotation therewith;

second stop means for limiting relative rotation of said base over a predetermined arc of rotation; and second means for releasably retaining said base in selective position over the arc of rotation.

12. The discharge chute assembly of claim 11, wherein said first stop means comprises flanges on the overlapping arcuate ends of said deflector and said chute.

13. The discharge chute assembly of claim 11, wherein said first retaining means includes a rubber washer frictionally engaged between portions of said deflector and said chute about the first transverse axis.

14. The discharge chute assembly of claim 11, further including:

a handle secured to said deflector.

15. The discharge chute assembly of claim 11, further including:

a lift handle secured to said base on a side away from said deflector.

* * * * *